(12) United States Patent
Arai (10) Patent No.: US 10,972,650 B2
(45) Date of Patent: Apr. 6, 2021

(54) COMMUNICATION APPARATUS AND CONTROL METHOD THEREOF

(71) Applicant: CANON KABUSHIKI KAISHA, Tokyo (JP)

(72) Inventor: Shieka Arai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/744,714

(22) Filed: Jan. 16, 2020

(65) Prior Publication Data
US 2020/0244892 A1 Jul. 30, 2020

(30) Foreign Application Priority Data
Jan. 24, 2019 (JP) .............................. JP2019-010541

(51) Int. Cl.
*H04N 5/232* (2006.01)
*G06K 9/34* (2006.01)
*H04N 5/247* (2006.01)
*G06F 40/109* (2020.01)

(52) U.S. Cl.
CPC ..... *H04N 5/232061* (2018.08); *G06F 40/109* (2020.01); *G06K 9/344* (2013.01); *H04N 5/23225* (2013.01); *H04N 5/247* (2013.01)

(58) Field of Classification Search
USPC ........................................................ 348/159
See application file for complete search history.

(56) References Cited

U.S. PATENT DOCUMENTS

| | | | |
|---|---|---|---|
| 2011/0205380 A1* | 8/2011 | Shirakawa | H04N 5/232 348/211.9 |
| 2013/0050461 A1* | 2/2013 | Wada | G06K 9/00288 348/77 |
| 2015/0146021 A1* | 5/2015 | Nishiguchi | H04N 5/23203 348/207.1 |
| 2016/0037563 A1* | 2/2016 | Debates | H04L 61/6022 455/41.2 |
| 2018/0241939 A1* | 8/2018 | Kawai | H04N 5/23203 |
| 2019/0335112 A1* | 10/2019 | Iko | H04N 5/247 |

FOREIGN PATENT DOCUMENTS

JP 2016-034103 A 3/2016

* cited by examiner

*Primary Examiner* — Behrooz M Senfi
(74) *Attorney, Agent, or Firm* — Cowan, Liebowitz & Latman, P.C.

(57) ABSTRACT

A communication apparatus comprises a communication unit configured to communicate with an external apparatus, a first reading unit configured to read predetermined information for specifying a type of the external apparatus from a captured image of the external apparatus, a presenting unit configured to present an operation procedure for setting connection information, according to the type of the external apparatus specified using the predetermined information, a second reading unit configured to read connection information from a captured image of the external apparatus, based on a display appearance of connection information according to the external apparatus, and a control unit configured to connect with the external apparatus via the communication unit by using the connection information acquired by the second reading unit.

12 Claims, 8 Drawing Sheets

FIG. 6B

# COMMUNICATION APPARATUS AND CONTROL METHOD THEREOF

BACKGROUND OF THE INVENTION

Field of the Invention

The present invention relates to techniques for communicably connecting devices to each other.

Description of the Related Art

In recent years, image capturing apparatuses, such as digital cameras, that have a simple access point function for wireless communication are known. If the access point function is activated in a digital camera, a communication device, such as a smart device, that supports wireless communication can detect the digital camera as an access point and join in a network formed by the digital camera. Thus, wireless communication can be easily realized between the digital camera and another device.

If a digital camera and a smart device are connected to each other using a wireless communication function, a list of images stored in the digital camera can be displayed on a display screen of the smart device and a selected image can be stored in the smart device, by using an application that runs on the smart device.

However, operations for establishing a connection with the smart device via an access point formed by the digital camera are complex for users who are unfamiliar with operations of devices, and it is desirable to be able to show the operation procedure to the user in an easy-to-follow manner. Japanese Patent Laid-Open No. 2016-34103 describes displaying a screen for showing the operation procedure for establishing a connection, to the user.

Conventionally, a connection is established by searching wireless LAN (Local Area Network) networks in a surrounding area in setting wireless LAN connection on the smart device side, displaying a list of SSIDs (Service Set IDentifiers) that are included in detected beacon signals, on a settings screen of the smart device, selecting the SSID of the digital camera through a user operation, and inputting an encryption key. However, if the user does not have sufficient knowledge about the communication function, the user may make a mistake or take time in operations for selecting the SSID and inputting the encryption key.

SUMMARY OF THE INVENTION

The present invention has been made in consideration of the aforementioned problems, and realizes techniques that improve operability at the time of connecting devices to each other.

In order to solve the aforementioned problems, the present invention provides a communication apparatus comprising: a communication unit configured to communicate with an external apparatus; a first reading unit configured to read predetermined information for specifying a type of the external apparatus from a captured image of the external apparatus; a presenting unit configured to present an operation procedure for setting connection information, according to the type of the external apparatus specified using the predetermined information; a second reading unit configured to read connection information from a captured image of the external apparatus, based on a display appearance of connection information according to the external apparatus; and a control unit configured to connect with the external apparatus via the communication unit by using the connection information acquired by the second reading unit.

In order to solve the aforementioned problems, the present invention provides a method of controlling a communication apparatus that communicates with an external apparatus, comprising: reading predetermined information for specifying a type of the external apparatus from a captured image of the external apparatus; presenting an operation procedure for setting connection information, according to the type of the external apparatus specified using the predetermined information; reading connection information from a captured image of the external apparatus, based on a display appearance of connection information according to the external apparatus; and connecting with the external apparatus by using the connection information.

In order to solve the aforementioned problems, the present invention provides a non-transitory computer-readable storage medium storing a program for causing a computer to execute a method of controlling a communication apparatus that communicates with an external apparatus, comprising: reading predetermined information for specifying a type of the external apparatus from a captured image of the external apparatus; presenting an operation procedure for setting connection information, according to the type of the external apparatus specified using the predetermined information; reading connection information from a captured image of the external apparatus, based on a display appearance of connection information according to the external apparatus; and connecting with the external apparatus by using the connection information.

According to the present invention, operability at the time of connecting devices to each other is improved, and a connection can be easily established even by a user who is unfamiliar with operations for connecting devices to each other.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Configuration of Digital Camera 100

Figure 1A:
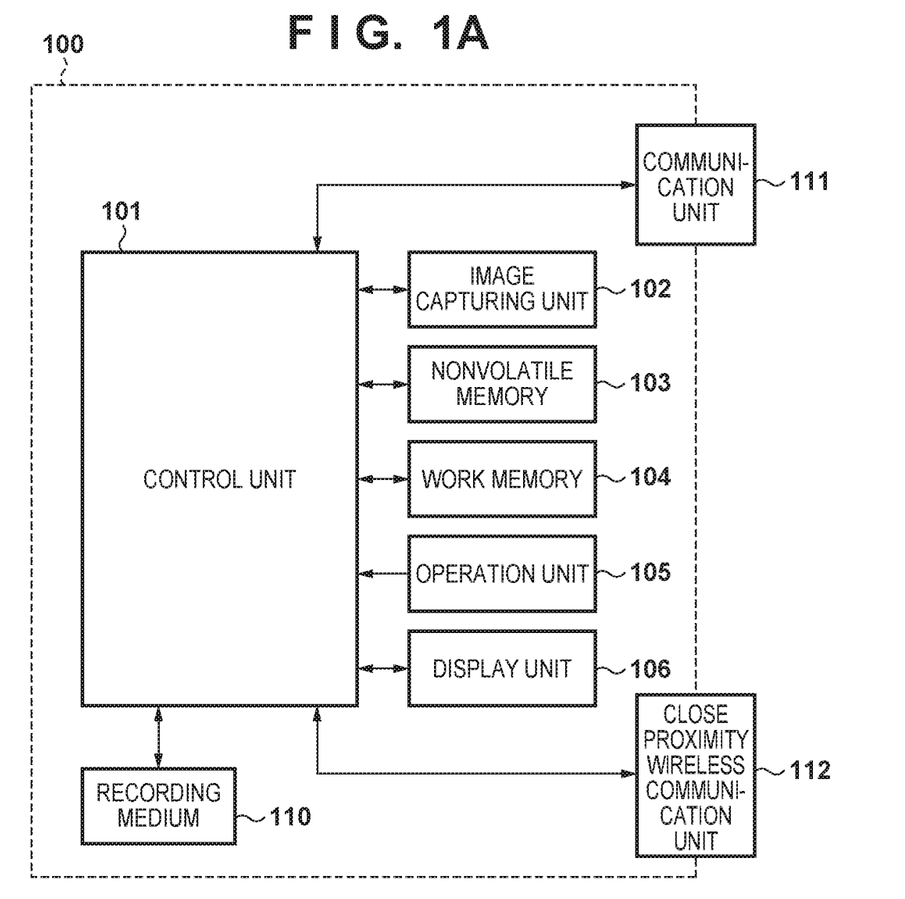
FIG. 1A is a block diagram showing a configuration of a digital camera according to a present embodiment.

First, the configuration and functions of the digital camera 100 that is an example of the image capturing apparatus of the present embodiment will be generally described with reference to FIG. 1A.

Note that, in the present embodiment, description is given regarding a digital camera that can shoot a still image or a moving image as an example of an image capturing apparatus, but there is no limitation to this, and an image capturing apparatus may be an information processing apparatus such as a personal computer or a tablet device equipped with a camera function, a monitoring camera, a medical camera, or the like.

A control unit 101 is an arithmetic processing unit (CPU), which comprehensively controls the overall digital camera 100, and implements communication processing and control processing (to be described later) by executing programs stored in a nonvolatile memory 103 (to be described later). Note that a plurality of pieces of hardware may control the overall apparatus by sharing processes instead of the control unit 101 controlling the overall apparatus.

An image capturing unit 102 includes a lens group including a zoom lens and a focus lens and a shutter having a stop function. The image capturing unit 102 also includes an image sensor formed from a CCD, CMOS element, or the like which converts an object image into electrical signal, and an A/D converter which converts the analog image signal output from the image sensor into digital signal. Under the control of the control unit 101, the image capturing unit 102 converts optical image of an object formed by the lens included in the image capturing unit 102 into electrical signal by the image sensor, performs noise reduction processing or the like on the converted signal, and outputs image data composed of digital signal.

The control unit 101 performs resizing processing, such as pixel interpolation and reduction, and color conversion processing on image data captured by the image capturing unit 102. The control unit 101 also performs compression encoding complying with JPEG or the like, on still image data that has undergone the above-described processing, or performs encoding complying with a moving image compression method such as MPEG2 or H.264, on moving image data, to generate an image file, and records the image file on a recording medium 110. The digital camera 100 according to the present embodiment records image data on the recording medium 110 according to the DCF (Design rule for Camera File system) standards. The control unit 101 also performs predetermined arithmetic processing using captured image data, and performs AF (Auto Focus) processing, AE (Auto Exposure) processing, and so on by controlling the focus lens, the stop, and the shutter of the image capturing unit 102 based on the results of arithmetic processing.

The nonvolatile memory 103 is an electrically erasable/recordable memory, and, for example, an EEPROM is used. Constants, programs, and the like for the operation of the control unit 101 are stored in the nonvolatile memory 103. Here, the programs are those for executing connection processing, which will be described later in the present embodiment.

A work memory 104 is used as a work area where constants and variables for the operation of the control unit 101, programs read out from the nonvolatile memory 103, and the like are to be loaded. The work memory 104 is also used as a buffer memory for temporarily storing the image data captured by the image capturing unit 102 or an image display memory for a display unit 106.

Figure 1B:
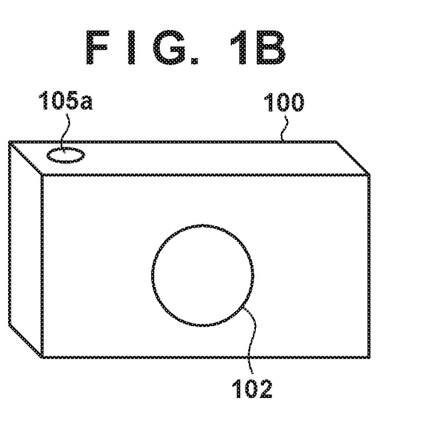
FIGS. 1B and 1C are a front view and a back view showing the configuration of the digital camera according to the present embodiment.
Figure 1C:
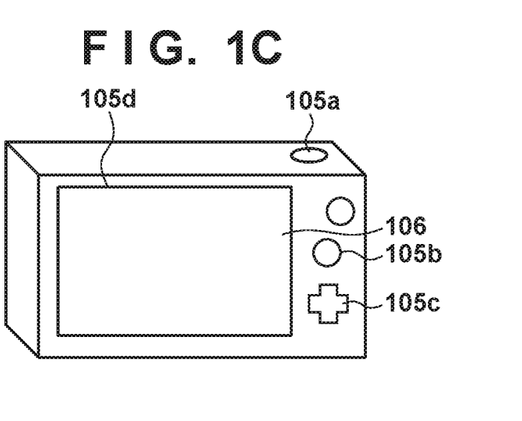

An operation unit 105 is constituted by operation members such as various types of switches and buttons, and a touch panel, which accept various types of operations from the user. The operation unit 105 includes, for example, a shutter button 105a for performing image shooting, a reproduction button 105b for performing a reproduction of shot images, and four-directional keys 105c constituted by up, down, left, and right buttons for various settings of the camera, as shown in FIGS. 1B and 1C. The operation unit 105 also includes a touch panel 105d that is formed integrally with the display unit 106 that will be described later. The operation unit 105 also includes an operation member such as a dedicated connection button for starting a communication with an external apparatus via a communication unit 111 (to be described later).

The shutter button 105a is turned on to generate a first shutter switch signal SW1 when the shutter button 105a is operated halfway, that is, half-pressed (a shooting preparation instruction). Upon receiving the first shutter switch signal SW1, the control unit 101 controls the image capturing unit 102 to start an operation such as AF (Auto Focus) processing, AE (Auto Exposure) processing, AWB (Auto White Balance) processing, or EF (Electronic Flash) processing. Also, the shutter button 105a is turned on to generate a second shutter switch signal SW2 when the shutter button 105a is operated completely, that is, full-pressed (a shooting instruction). Upon receiving the second shutter switch signal SW2, the control unit 101 starts a series of shooting operations from reading out a signal from the image capturing unit 102 to writing image data in the recording medium 110.

The display unit 106 displays, for example, a viewfinder image at the time of shooting, a captured image, and characters for a dialogical operation. The display unit 106 is, for example, a display device such as a liquid crystal display or an organic EL display. The display unit 106 may be formed integrally with the digital camera 100, or an external apparatus connected to the digital camera 100. The digital camera 100 needs only be connectable to the display unit 106 and have the function of controlling display performed by the display unit 106.

Image data output from the image capturing unit 102 is recorded on the recording medium 110, and an image file that has been recorded thereon by the control unit 101 is read out from the recording medium 110. The recording medium 110 may be a memory card or a hard disk drive that is externally attached to the digital camera 100, or a flash memory or a hard disk drive that is built into the digital camera 100. The digital camera 100 may have at least a function for accessing the recording medium 110.

The communication unit 111 is an interface for communicably connecting to an external apparatus such as a smart device 200 (to be described later). The digital camera 100 according to the present embodiment can exchange data with an external apparatus via the communication unit 111. For example, image data generated in the image capturing unit 102 can be transmitted to an external apparatus via the communication unit 111. Note that, in the present embodiment, the communication unit 111 includes an interface for communication with an external apparatus via a wireless LAN complying with the IEEE 802.11 standards. The control unit 101 implements wireless communication with an external apparatus by controlling the communication unit 111. Note that the communication method is not limited to a wireless LAN, and may include a wireless communication interface such as an infrared communication interface or a wireless USB.

A close proximity wireless communication unit 112 includes, for example, an antenna for wireless communication, a modulation/demodulation circuit for processing wireless signal, and a communication controller. The close proximity wireless communication unit 112 outputs modulated wireless signal from the antenna and demodulates the wireless signal received by the antenna. Thus, non-contact near field communication complying with the ISO/IEC 18092 standard (so-called NFC: Near Field Communication) is implemented. The close proximity wireless communication unit 112 of the present embodiment is arranged on the side portion of the digital camera 100.

Figure 2A:
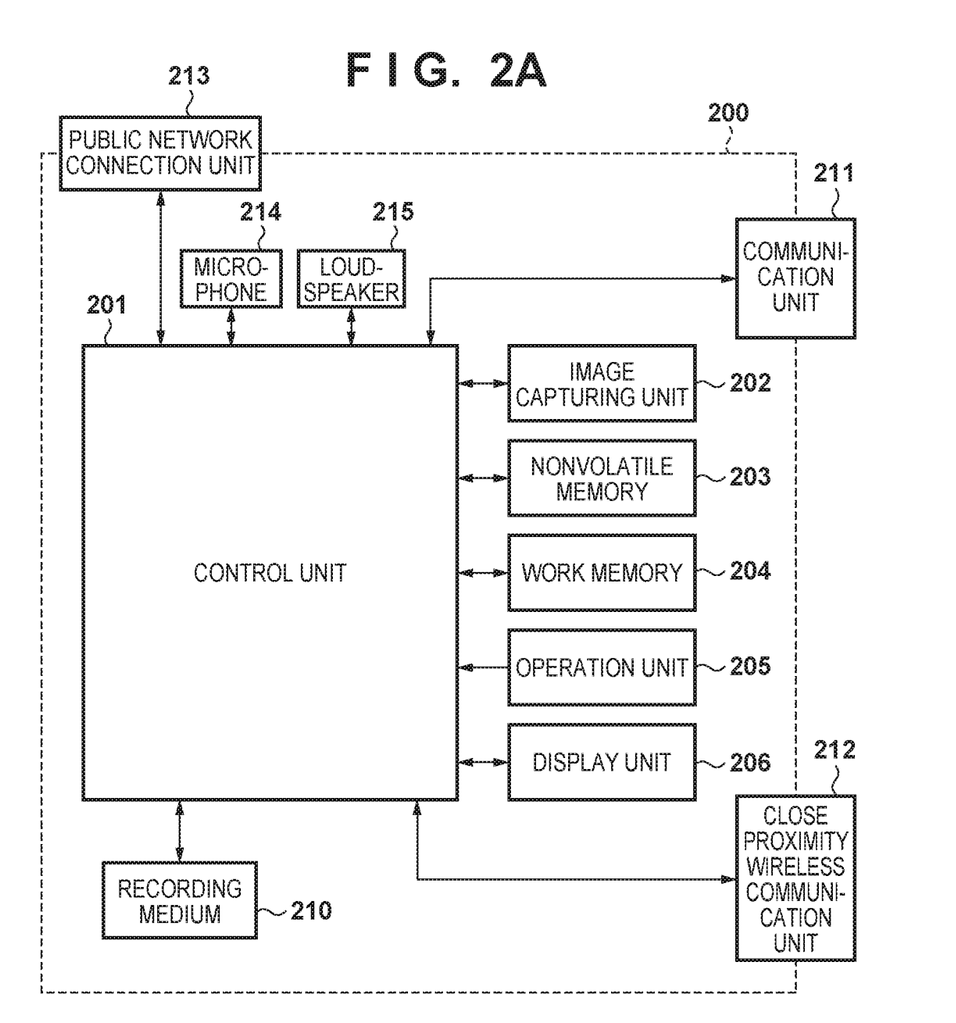
FIG. 2A is a block diagram showing the configuration of a smart device according to the present embodiment.

The digital camera 100 connects to the smart device 200 and starts communication therewith as a result of the close proximity wireless communication unit 112 of the digital camera 100 being brought into close proximity of a close proximity wireless communication unit 212 of the smart device 200. Note that in a case where a connection is made using the close proximity wireless communication unit 112, there is no necessity to have the close proximity wireless communication units 112 and 212 touch each other. Because communication is possible, even if the close proximity wireless communication units 112 and 212 are separated by a certain distance, to have a mutual connection it is sufficient if they are near each other within a range in which close proximity wireless communication is possible. Below approaching to within a range where the close proximity wireless communication is possible is described as "causing to be in close proximity".

In addition, communication is not started if the close proximity wireless communication units 112 and 212 are mutually in a range where close proximity wireless communication is impossible. In addition, in a case where the close proximity wireless communication units 112 and 212 are in a range where close proximity wireless communication with each other is possible and the devices communicate and are connected to each other, when the close proximity wireless communication units 112 and 212 are separated to a range where close proximity wireless communication with each other is impossible, the communication is disconnected and the connection is released. Note that contactless proximity communication implemented by the close proximity wireless communication units 112 and 212 is not limited to NFC and other wireless communication may be employed. For example, contactless proximity communication in accordance with an ISO/IEC 14443 standard may be employed as contactless proximity communication that the close proximity wireless communication units 112 and 212 implement.

In the present embodiment, the communication speed or rate of the communication implemented by the communication unit 111 is higher than the communication speed of the communication implemented by the close proximity wireless communication unit 112. Also, the communicable range of the communication unit 111 is wider than the communicable range of the close proximity wireless communication unit 112. In contrast, in communication by the close proximity wireless communication unit 112, because it is possible to limit a communication partner due to the narrowness of a range where communication is possible, processing such as an exchange of an encryption key needed for communication implemented by the communication unit 111 is not necessary. In other words, communication can be performed more easily than using the communication unit 111.

Note that the communication unit 111 of the digital camera 100 in the present embodiment has an AP mode that operates as an access point in the infrastructure mode and a CL mode that operates as a client in the infrastructure mode. By operating the communication unit 111 in the CL mode, the digital camera 100 of the present embodiment can operate as a CL device in the infrastructure mode. When the digital camera 100 operates as the CL device, the digital camera 100 can join in the network formed by the AP device by connecting to the neighboring AP device. In addition, by operating the communication unit 111 in the AP mode, the digital camera 100 can operate as a simple AP (hereinafter referred to as "simple AP") which is a kind of AP, but has a limited function. When the digital camera 100 operates as the simple AP, the digital camera 100 forms a network by itself. A device in the vicinity (surrounding area) of the digital camera 100 can recognize the digital camera 100 as the AP device and join in a network formed by the digital camera 100. Assume that the program for operating the digital camera 100 as described above is stored in the nonvolatile memory 103.

Note that while the digital camera 100 in the present embodiment is a type of AP, it is a simple AP that does not have a gateway function for transferring data received from a CL device to an Internet provider or the like. Accordingly, even if data is received from another apparatus participating in a network formed by the self-apparatus, it is not possible to transfer this data to a network such as the Internet.

Configuration of Smart Device 200

Next, the configuration and functions of the smart device 200 according to the present embodiment will be generally described with reference to FIG. 2A.

Although the present embodiment describes a smart device having a camera function as an example of a communication apparatus, the communication apparatus is not limited to a smart device, and may be a digital camera equipped with a communication function, a smartphone, which is a type of cellular phone, a tablet device, a personal computer, or a wearable computer such as a smart watch that has the shape of a wristwatch or smart glasses that have the shape of a pair of glasses.

The smart device 200 according to the present embodiment includes a control unit 201, an image capturing unit 202, a nonvolatile memory 203, a work memory 204, an operation unit 205, a display unit 206, a recording medium 210, a communication unit 211, and the close proximity wireless communication unit 212. The basic functions of these components are the same as those of the digital camera 100, and hence a detailed description of them will be omitted.

The nonvolatile memory 203 stores an OS (operating system), which is the basic software that is to be executed by the control unit 201, and applications which implement extended functions in cooperation with this OS. Also, in the present embodiment, the nonvolatile memory 203 stores an application for communicating with the digital camera 100.

Processing of the smart device 200 of the present embodiment is implemented by loading software that is provided by the application. Note that the application includes software that is executed when basic functions of the OS installed in the smart device 200 are to be used. Alternatively, the OS in the smart device 200 may include software that is executed to implement processing according to the present embodiment.

The communication unit 211 includes a wireless communication interface for wireless communication with an external apparatus such as the digital camera 100. The control unit 201 implements wireless communication with an external apparatus by controlling the communication unit 211. The communication unit 211 may be configured to be connected directly to the digital camera 100, or connected via an access point. PTP/IP (Picture Transfer Protocol over Internet Protocol) for communication via a wireless LAN may be used as a protocol for data communication, for example. Note that the communication with the digital camera 100 is not limited in them. For example, the communication unit 211 may include a wireless communication module such as an infrared communication module, a Bluetooth® communication module, or a wireless USB. Also, the communication method may include a wired communication method such as USB cable, HDMI® or IEEE 1394, etc.

Upon receiving a data read request from another device, the close proximity wireless communication unit 212 outputs response data based on data stored in the nonvolatile memory 203. In the present embodiment, the smart device 200 mainly acts as Initiator, and, via the close proximity wireless communication unit 212, operates in a card reader mode, a card writer mode, and a P2P mode which are defined in an NFC standard. In contrast, the digital camera 100 mainly acts as Target, via the close proximity wireless communication unit 112.

A public network connection unit 213 is an interface used for wireless communication via a Wide Area Network (WAN), such as 3G or LTE. The smart device 200 can make a telephone call and perform data communication with another device via the public network connection unit 213. When making a telephone call, the control unit 201 inputs and outputs voice signals via a microphone 214 and a loudspeaker 215. In this embodiment, the public network connection unit 213 is not limited to 3G or LTE, and may use another communication method such as WiMAX, ADSL, or FTTH. In the present embodiment, the public network connection unit 213 is an antenna, and the control unit 201 can connect to a public network via the antenna. Note that the communication unit 211 and the public network connection unit 213 are not necessarily formed using independent pieces of hardware. For example, both the communication unit 211 and the public network connection unit 213 may be formed using a single antenna.

System Configuration

Next, the configuration of connection between the digital camera 100 and the smart device 200 and an application according to the preset embodiment will be described with reference to FIG. 2B.

Figure 2B:
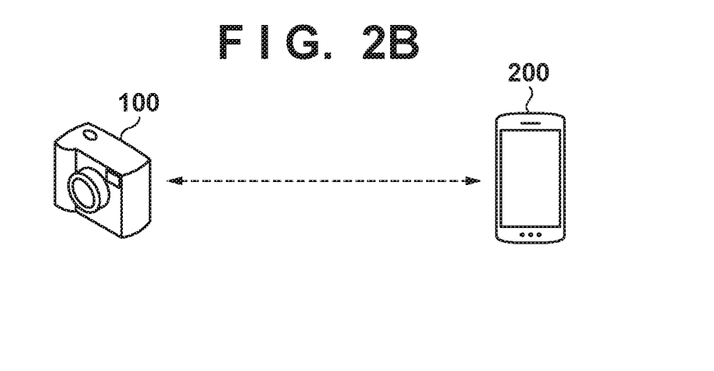
FIG. 2B is a diagram showing a system configuration according to the present embodiment.

FIG. 2B shows an example of the configuration of communication according to the present embodiment in which the digital camera 100 and the smart device 200 are directly connected to each other not via other access points. When a user makes an operation on a menu screen or the like, the digital camera 100 activates a simple access point function for wireless communication. At this time, values that are input through the user operation are used as communication parameters of a network that the digital camera generates as an access point. As a result, the digital camera 100 starts to broadcast a beacon that includes some (in this example, SSID) of the communication parameters, and forms a network.

In the smart device 200, an application for communicating with the digital camera 100, which has been installed in the smart device 200, is activated, and the application accepts selection of an item for starting wireless LAN connection, which is displayed in the display unit 206, for example.

The smart device 200 detects the beacon signal and joins in the wireless LAN network formed by the digital camera 100. The digital camera 100 and the smart device 200 establish a connection with each other by finding each other and acquiring capabilities of each other, for example, and thus enter a state in which data can be exchanged with each other.

When a connection is established between the digital camera 100 and the smart device 200, the user can execute functions of the application running on the smart device 200. For example, the user can display a list of thumbnails of image data that is stored in the digital camera 100, in the display unit 206 of the smart device 200, and store desired image data in the smart device 200. In the present embodiment, when a connection with the digital camera 100 is established, the control unit 201 controls the display unit 206 to display a menu screen of the application. Items for transitioning to an image viewing screen and an application setting screen are arranged on the menu screen. On the image viewing screen, the user can view thumbnails of image data stored in the digital camera 100, and use a function for saving desired image data in the smart device. The user can check and change settings regarding the operation of the application through the application setting screen. Also, the application in the present embodiment holds an operation procedure for wireless LAN connection for each digital camera that is supported, and has a function of presenting, to the user, the operation procedure for wireless LAN connection according to the digital camera to be connected, in an easy-to-follow manner.

Operation Procedure

Next, a procedure of operations for establishing a wireless LAN connection by using the functions of the application in the present embodiment will be described with reference to FIGS. 3A-3I and 4A-4B.

Figure 4A:
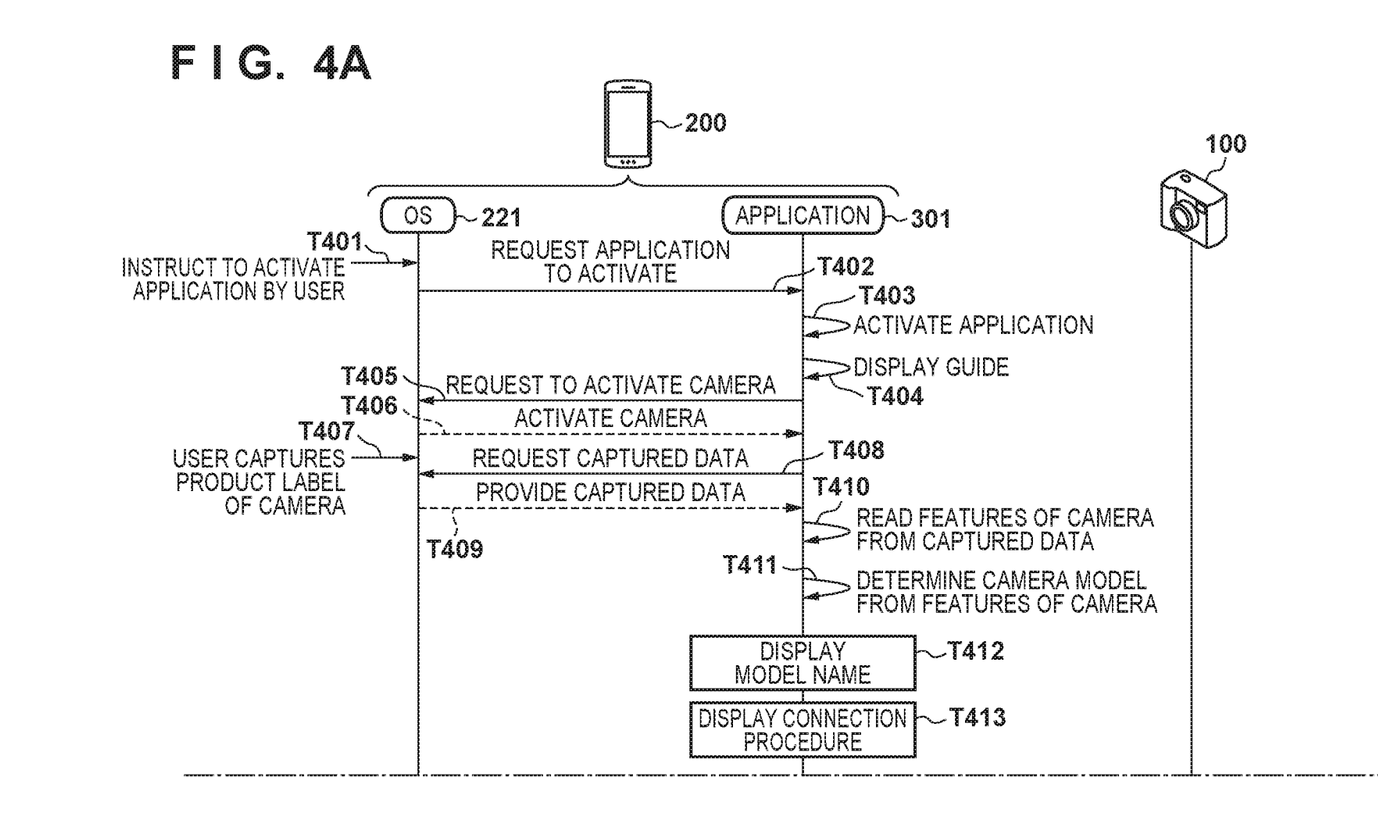
FIGS. 4A-4B are sequence diagrams showing operations of the digital camera and the smart device according to the present embodiment.
Figure 4B:
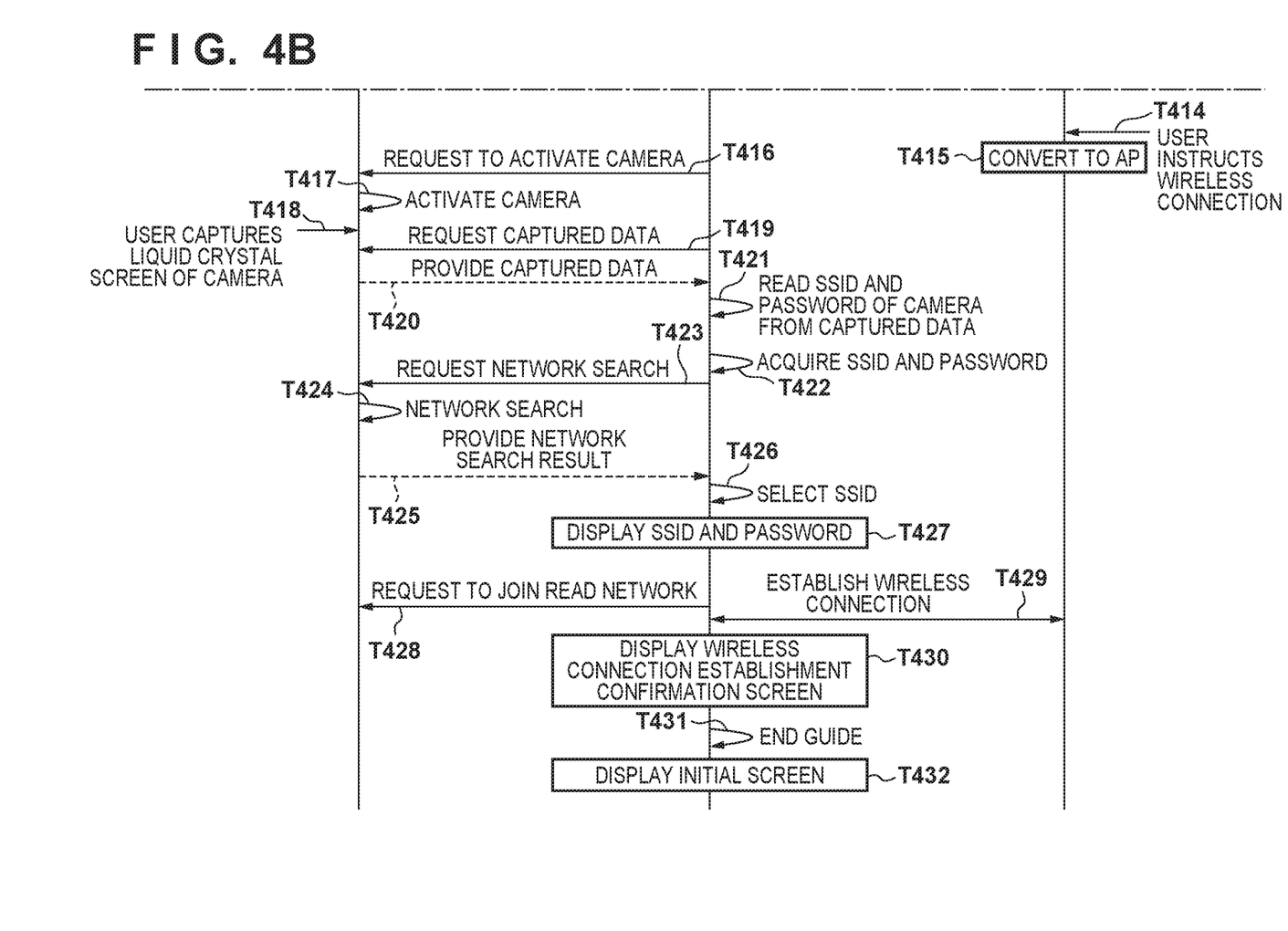

FIGS. 4A-4B show an example of a sequence of operations of the digital camera 100 and the smart device 200 according to the present embodiment.

Figure 3A:
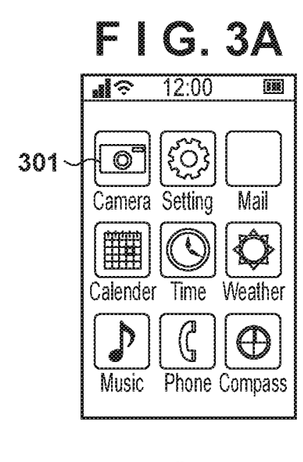
FIGS. 3A-3I are diagrams illustrating User Interface screens of an application of the smart device according to the present embodiment.

At T401 in FIG. 4A, if an OS 221 determines that an application 301 shown in FIG. 3A is selected through a user operation, the OS 221 determines that an application activation instruction is accepted. At T402, the OS 221 requests the application 301 to start. As a result, at T403, the application 301 is activated and displays an initial screen of the application shown in FIG. 3B.

Figure 3B:
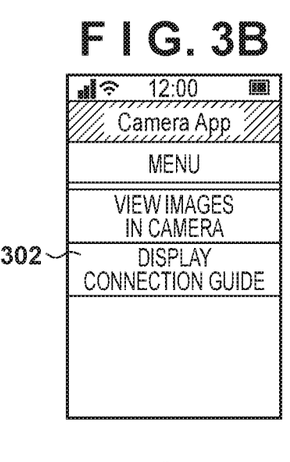

At T404, if the application 301 determines that a button 302 shown in FIG. 3B is selected through a user operation, the application 301 displays a connection guide. The connection guide is a function of the application 301 for displaying, in the display unit 206, a screen for presenting the operation procedure for establishing a wireless LAN connection between the digital camera 100 and the smart device 200 to the user. This enables the user to easily perform complex setting operations for wireless LAN connection, following the operation procedure.

Figure 3C:
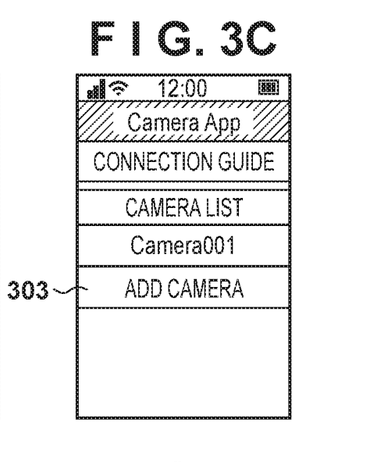
Figure 3D:
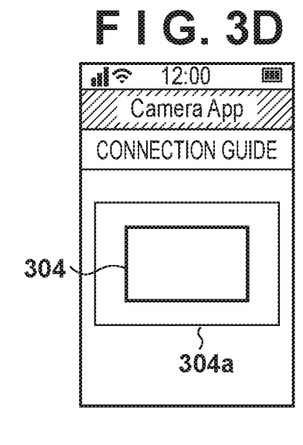

At T405, if the application 301 determines that a button 303 is selected through a user operation made on a connection start screen shown in FIG. 3C, the application 301 instructs the OS 221 to activate the image capturing unit 202. Upon receiving the instruction for activating the image capturing unit 202, the OS 221 activates the image capturing unit 202 at T406.

At T407, the application 301 allows the user to capture a product label of the digital camera 100, which will be described later. At this time, the application 301 renders a frame 304 that conforms to a product label 304*a* shown in FIG. 3D. Therefore, the user can capture the product label while checking the product label.

At T408, the application 301 requests captured data from the OS 221. Upon receiving the request for the captured data, the OS 221 provides the captured data to the application 301 at T409. The application 301 reads features of a model from the captured data at T410, and determines the model of the digital camera 100 at T411.

The application 301 determines the model by causing the user to determine the model of the digital camera 100. When the model is determined, model information regarding the digital camera 100 is held by the application 301. In the present embodiment, a model number that is uniquely defined according to the model (type) of the digital camera 100 is used as identification information. Note that the identification information is not limited to the model number, and is only required to be information with which the model of the digital camera can be identified. For example, the identification information may be the appearance of the digital camera or a label on which the product name is written. If model information regarding a specific digital camera is held in the connection guide of the application through determination of the model, dedicated display or dedicated functions can be performed by the application 301.

Figure 3E:
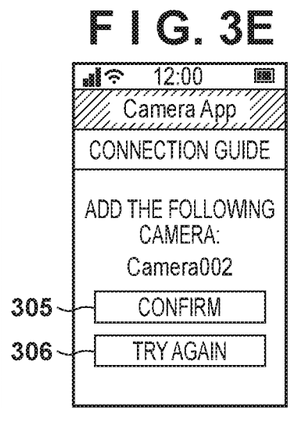

At T412, the application 301 displays the model name in the display unit 206. Thus, the application allows the user to confirm the model name of the digital camera 100 to be connected. FIG. 3E shows an example of display of the model name. In FIG. 3E, a confirmation button 305 is the button to be selected if the model determination result is correct, and a retake button 306 is the button to be selected if the model determination result is wrong.

Figure 3F:
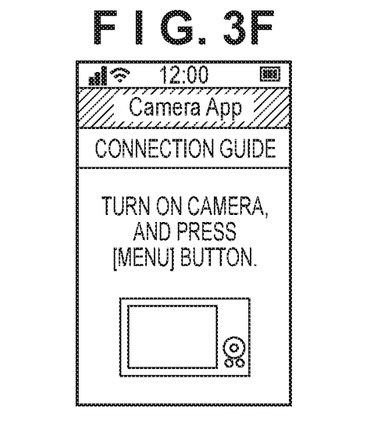

If the application 301 determines that the confirmation button 305 is selected, the application 301 displays the operation procedure for wireless LAN connection according to the model at T413, and allows the user to make a menu operation or the like for setting wireless LAN connection at T414. FIG. 3F shows an example of display of the connection guide. In response to a wireless LAN connection setting operation or the like made by the user, at T415, the control unit 101 of the digital camera 100 activates the simple access point function and displays a connection standby screen, which will be described later, in the display unit 106. An SSID and a password that are issued using the simple access point function are displayed on the connection standby screen.

At T416, the application 301 instructs the OS 221 to activate the image capturing unit 202. Upon receiving the instruction for activating the image capturing unit 202, the OS 221 activates the image capturing unit 202 at T417. At T418, the application 301 allows the user to capture the screen of the display unit 106 of the digital camera 100. At this time, the application 301 renders a frame 307 in a live view 307*a* shown in FIG. 3G. Therefore, the user can capture the screen while checking the display unit 106 of the digital camera 100.

At T419, the application 301 requests captured data from the OS 221. Upon receiving the request for the captured data, the OS 221 provides the captured data to the application 301 at T420. The application 301 reads wireless LAN connection information regarding the digital camera 100 from the captured data at T421, and acquires the SSID and the password of the digital camera 100 at T422. If the application 301 holds model information, the application 301 switches the method for reading the SSID and the password of the digital camera 100X) according to the model information, and holds acquired information. For example, the application 301 switches to a method of reading the SSID and the password displayed in the display unit 106 of the digital camera 100. With this configuration, reading of unnecessary information is limited even if the configuration or content of display performed by the display unit 106 varies, and therefore the accuracy of reading is improved.

At T423, the application 301 transmits an instruction for starting to establish a wireless LAN connection, to the OS 221. Upon receiving the instruction for starting connection, the OS 221 searches networks and receives beacon signals that are broadcast in the vicinity, at T424.

Figure 3G:
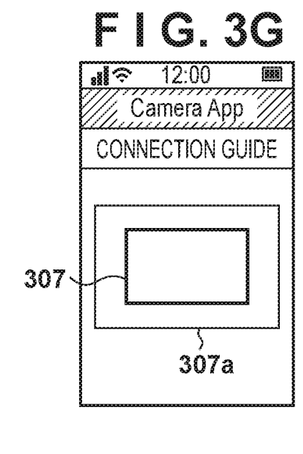
Figure 3H:
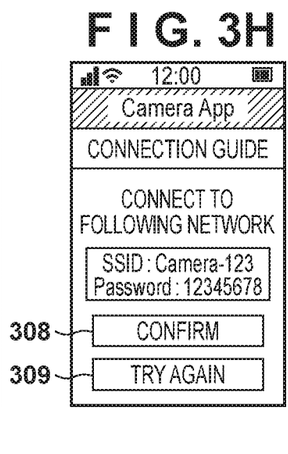

At T425, the OS 221 provides the application 301 with information regarding beacon signals received through the search of networks. Upon receiving the information regarding beacon signals, the application 301 determines, at T426, whether there is an SSID that matches the SSID of the digital camera 100, which is held by the application 301. If there is a matching SSID, the application 301 displays the SSID and the password of the digital camera 100 in the display unit 206 at T427. Thus, the application 301 can allow the user to check whether the selected SSID matches the SSID displayed in the display unit 106 of the digital camera 100. FIG. 3H shows an example of display of the SSID and the password of the digital camera 100. When determining, at T426, whether there is an SSID that matches the SSID held by the application 301, if there is no matching SSID, but there is a similar SSID, the application 301 determines that the similar SSID matches the SSID held by the application 301. With this configuration, the probability of a connection being established increases even if the accuracy of reading of the SSID and the password at T421 is insufficient.

Figure 3I:
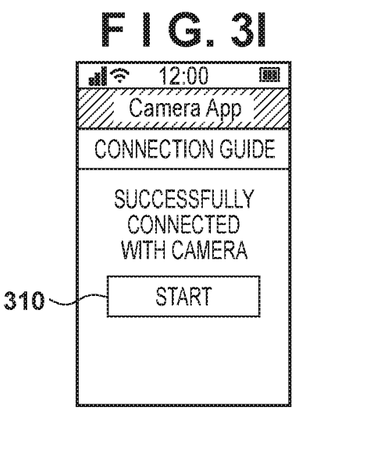

At T428, the application 301 instructs the OS 221 to join in the selected network. Following the instruction for joining in the network, the OS 221 establishes a wireless LAN connection between the digital camera 100 and the smart device 200 at T429. A connection at an application layer level is also established between the digital camera 100 and the application 301 via the OS 221. Thereafter, a connection establishment confirmation screen shown in FIG. 3I is displayed in the display unit 206 at T430 to notify the user of the establishment of the connection.

If the application 301 determines that a button 310 is selected through a user operation, the application 301 ends the connection guide at T431 and displays the initial screen shown in FIG. 3B at T432.

Figure 5A:
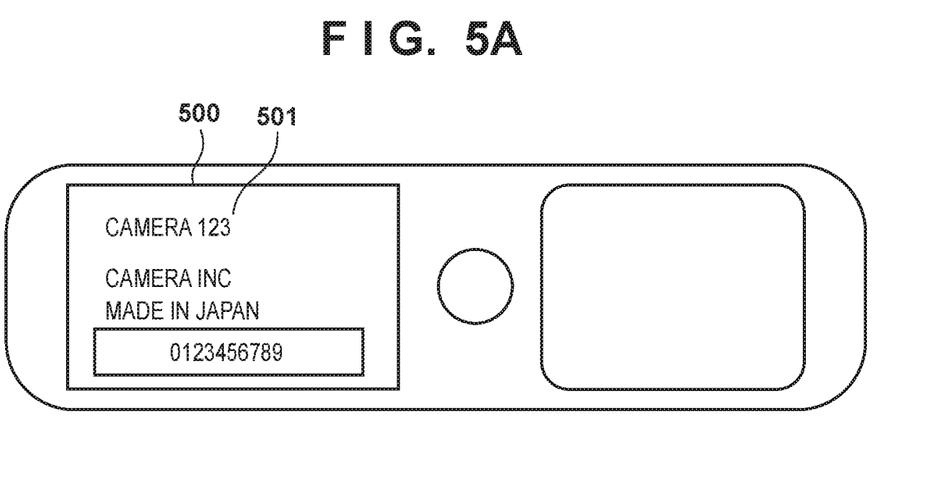
FIGS. 5A-5B are examples of information that the smart device of the present embodiment captures.
Figure 5B:
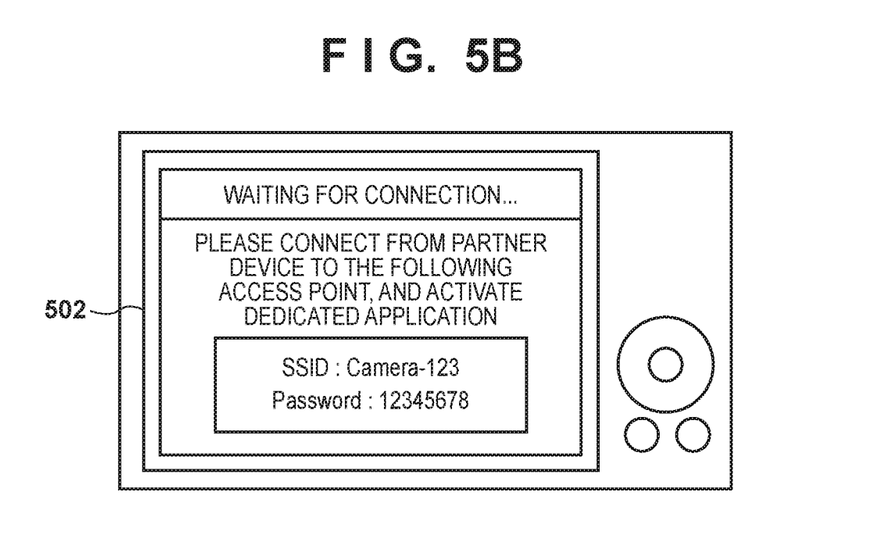

The following describes information that is captured by the image capturing unit 202 of the smart device 200 in order to read the model and the wireless LAN connection information regarding the digital camera 100 with reference to FIGS. 5A-5B.

FIG. 5A shows a product label 500 that is attached to a bottom surface portion of a camera body of the digital camera 100. The product label 500 is attached to the bottom surface portion of the camera body. Product information, information that is required under legal restrictions, a serial number that is stamped in a factory, and the like are displayed on the product label 500. The product label 500 includes a model number 501. The model number 501 is information for uniquely determining the model of the digital camera 100. Information determined based on the model number 501 is the model name, the generation, naming rules of the SSID and password, and the like.

FIG. 5B shows an information display screen that is displayed in the display unit 106 of the digital camera 100. In FIG. 5B, the SSID and the password that are issued using the simple access point function are displayed on the information display screen 502.

Connection Processing

Figure 6A:
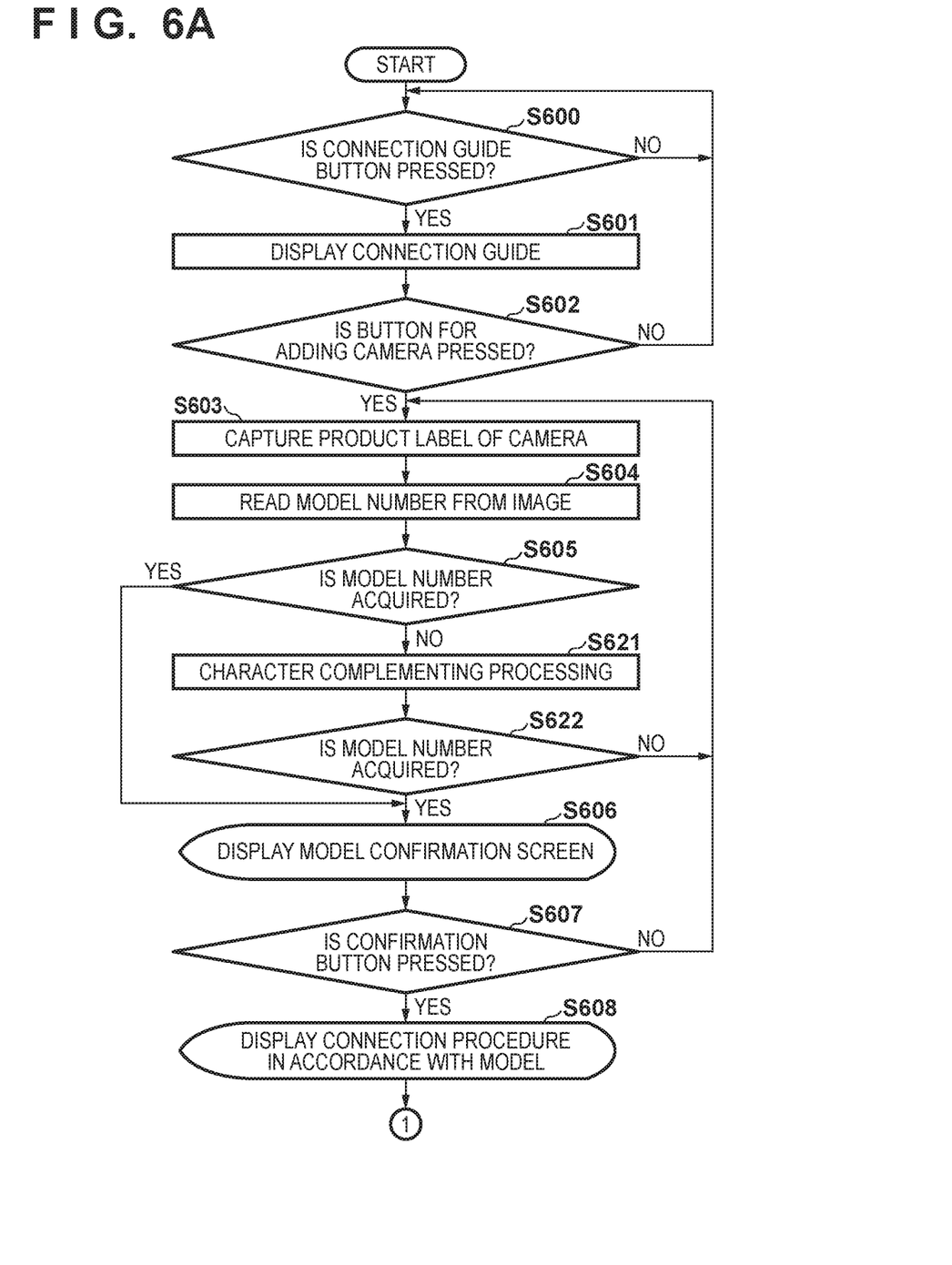
FIGS. 6A-6B are flow charts showing an operation of the smart device according to the present embodiment.
Figure 6B:
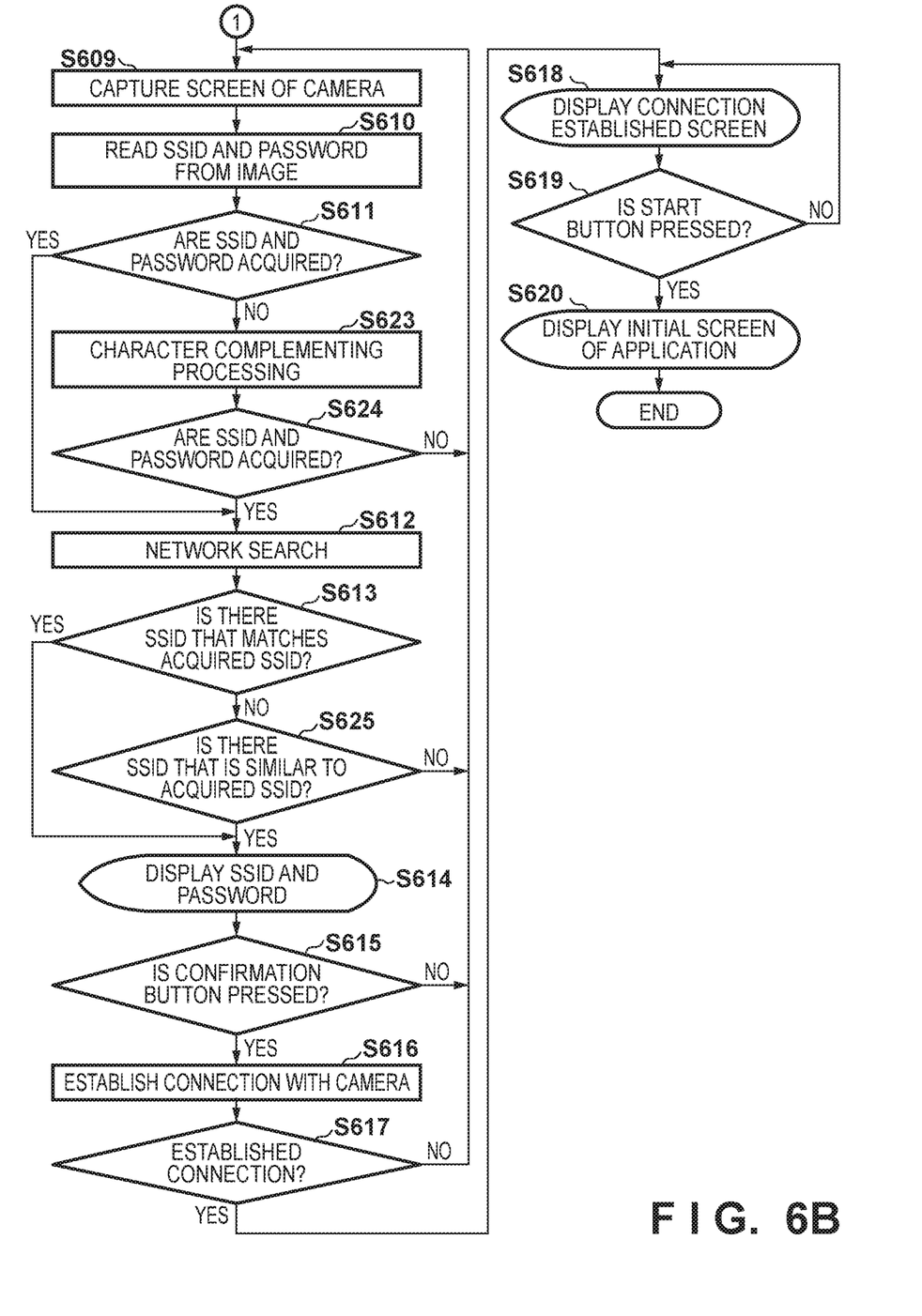

The following describes, with reference to FIGS. 6A-6B, processing that is performed by the smart device 200 according to the present embodiment when establishing a wireless LAN connection with the digital camera 100.

Note that the processing shown in FIGS. 6A-6B is implemented as a result of the control unit 201 of the smart device 200 executing a program stored in the nonvolatile memory 203 and controlling the units of the smart device 200. The processing shown in FIG. 6A-6B starts as a result of the application 301 stored in the nonvolatile memory 203 being activated through a user operation made on a menu screen or the like.

In step S600, the control unit 201 controls the display unit 206 to display the menu screen of the application 301 shown in FIG. 3B, and determines whether the connection guide 302 shown in FIG. 3B is selected through a user operation. If it is determined that the connection guide 302 is selected, the control unit 201 advances the processing to step S601.

In step S601, the control unit 201 controls the display unit 206 to display the menu screen shown in FIG. 3C through which the user selects the digital camera 100 to be connected.

In step S602, the control unit 201 determines whether the button 303 for adding the digital camera 100 is selected through a user operation, and if it is determined that the button 303 is not selected, the control unit 201 returns the processing to step S600, and if it is determined that the button 303 is selected, the control unit 201 advances the processing to step S603. Here, model determination may be performed based on model information input through a user operation.

In step S603, the control unit 201 activates the image capturing unit 202, performs control for prompting the user to capture the product label 500 of the digital camera 100 shown in FIG. 5A, and advances the processing to step S604. At this time, upon receiving a capturing start instruction that is given through a user operation made on the menu or the like, the control unit 201 performs control for displaying live view images, which are sequentially captured by the image capturing unit 202, on the screen shown in FIG. 3D. Thereafter, the control unit 201 converts a live view image into image data of a predetermined format, and performs control for displaying the frame 304 on the live view image displayed on the screen shown in FIG. 3D. Thus, the range from which characters are to be read can be specified when the user captures the product label 500, and therefore operability for the user and the accuracy of reading are improved. Note that a configuration is also possible in which characters are automatically read from the live view image.

In step S604, the control unit 201 extracts character information from the image by performing character recognition on the image data generated in step S603. A configuration is also possible in which the control unit 201 performs image processing on the image captured in step S603, before performing character recognition, so that the accuracy of character recognition is improved. Since character recognition processing is performed using well-known techniques, a description thereof is omitted.

In step S605, the control unit 201 determines whether character string information that is obtained as the result of character recognition includes a model number that is included in a list of model numbers that is held in the nonvolatile memory 203. If it is determined that the model number is included, the control unit 201 advances the processing to step S606, and if it is determined that the model number is not included, the control unit 201 advances the processing to step S621 and performs character complementing processing. The character complementing processing will be described later. Note that identification information is not limited to the model number, and is only required to be information that can be used for identifying the model of the digital camera. For example, the identification information may be the appearance of the digital camera or a label on which the product name is written. In FIG. 5A, "CAMERA-123" is written as the model number of the digital camera 100, and "CAMERA INC" is written as the company name.

In step S622, the control unit 201 determines whether the model can be determined after the character complementing processing, and if it is determined that the model cannot be determined, the control unit 201 returns the processing to step S603, and if it is determined that the model can be determined, the control unit 201 advances the processing to step S606.

In step S606, the control unit 201 controls the display unit 206 to display a model determination result confirmation screen shown in FIG. 3E. Thus, the control unit 201 allows the user to confirm the model determination result. Note that information that is acquired based on the model number is not limited to the model name (manufacturer name), the generation of the model, the SSID and password, and the like, and may be information that indicates features of the digital camera. For example, the information may be naming rules of the SSID and the password of the digital camera, functions installed in the digital camera, or functions that can be used through the application 301.

In step S607, the control unit 201 determines whether the confirmation button 305 on the confirmation screen shown in FIG. 3E is selected through a user operation. If it is determined that the confirmation button 305 is not selected and the retake button 306 is selected, the control unit 201 returns the processing to step S603, and if it is determined that the confirmation button 305 is selected, the control unit 201 advances the processing to step S608.

In step S608, the control unit 201 controls the display unit 206 to display the screen shown in FIG. 3F for presenting the operation procedure for wireless LAN connection to the user. Here, the control unit 201 causes the display unit 206 to display the operation procedure according to the model, out of a plurality of information pieces regarding operation procedures that are held for respective models in the nonvolatile memory 203. As a result of the user making an operation on the menu screen or the like, the control unit 101 of the digital camera 100 controls the display unit 106 to display the information display screen 502 shown in FIG. 5B. The SSID and the password of the digital camera 100 are displayed on the information display screen 502.

In step S609, the control unit 201 activates the image capturing unit 202, controls the image capturing unit 202 to capture the information display screen 502 shown in FIG. 5B, and advances the processing to step S610. At this time, upon receiving a capturing start instruction that is given through a user operation made on the menu screen or the like, the control unit 201 controls the display unit 206 to display a live view image. Thereafter, the control unit 201 acquires image data and converts the image data into a predetermined format. Also, the control unit 201 performs control for displaying the frame 307 on the live view image as shown in FIG. 3G. The configuration of the frame 307 may also be changed according to the model. Thus, the user is provided with a guide when capturing the information display screen 502, and operability for the user and the accuracy of reading are improved.

In step S610, the control unit 201 performs character recognition processing on the image captured in step S609. A configuration is also possible in which the control unit 201 performs control for performing image processing before character recognition so that the accuracy of character recognition is improved. In addition to this, a configuration is also possible in which the control unit 201 determines a display form (display appearance) of the information display screen 502 based on model information and switches the method for reading the SSID and the password according to the model. A configuration is also possible in which the control unit 201 determines the font used in that displayed on the information display screen 502 by the display unit 106, based on model information, and switches the character recognition method according to the model. With this configuration, the control unit 201 reads characters by using the most appropriate method according to the model, and therefore the accuracy of reading is improved.

In step S611, the control unit 201 determines whether an SSID and a password can be acquired from character information read in step S610, and if it is determined that an SSID and a password cannot be acquired, the control unit 201 advances the processing to step S623, and if it is determined that an SSID and a password can be acquired, the control unit 201 advances the processing to step S612.

In step S623, the control unit 201 performs character complementing processing on the character information read in step S610. The character complementing processing will be described later.

In step S624, the control unit 201 determines whether an SSID and a password can be acquired after the character complementing processing, and if it is determined that an SSID and a password cannot be acquired, the control unit 201 returns the processing to step S609, and if it is determined that an SSID and a password can be acquired, the control unit 201 advances the processing to step S612.

In step S612, the control unit 201 searches wireless communication networks in the vicinity of the smart device 200, and holds a list of SSIDs that are included in detected beacon signals, in the nonvolatile memory 203.

In step S613, the control unit 201 determines whether the list of detected SSIDs includes an SSID that matches the acquired SSID, and if it is determined that the list includes a matching SSID, the control unit 201 advances the processing to step S614, and if it is determined that the list does not include a matching SSID, the control unit 201 advances the processing to step S625.

In step S625, the control unit 201 determines whether the list of detected SSIDs includes an SSID that is similar to the acquired SSID, and if it is determined that the list does not include a similar SSID, the control unit 201 returns the processing to step S609, and if it is determined that the list includes a similar SSID, the control unit 201 advances the processing to step S614.

In step S614, the control unit 201 controls the display unit 206 to display a confirmation screen of the application shown in FIG. 3H on which the SSID and the password of the simple access point function of the digital camera 100, which are acquired in step S624, are displayed. Thus, the control unit 201 allows the user to confirm the SSID and the password of the simple access point function of the digital camera 100. A configuration is also possible in which the control unit 201 controls the display unit 206 to display functions of the application that can be used if a connection is established using the SSID and the password displayed on the screen. In this case, the password is not always necessary.

In step S615, the control unit 201 determines whether a confirmation button 308 on the confirmation screen shown in FIG. 3H is selected. If it is determined that the confirmation button 308 is not selected and a retake button 309 is selected, the control unit 201 returns the processing to step S609, and if it is determined that the confirmation button 308 is selected, the control unit 201 advances the processing to step S616.

In step S616, the control unit 201 performs control for joining in a network that has the SSID that has been determined as matching in step S613 or the SSID that has been determined as being similar in step S625. Note that a configuration is also possible in which the search of networks is performed two times, that is, after the reading in step S604 and after the reading in step S610, and control is performed in step S616 for joining in a network that has an SSID that matches or is similar to the SSID of a network that is included in networks increased during a period between the first and second searches.

In step S617, the control unit 201 determines whether a connection has been established with the network having the detected SSID, and if it is determined that a connection cannot be established, the control unit 201 returns the processing to step S609, and if it is determined that a connection has been established, the control unit 201 advances the processing to step S618.

In step S618, the control unit 201 controls the display unit 206 to display the screen shown in FIG. 3I for confirming that a connection has been established with the digital camera 100. As a result, the user confirms that the connection has been established.

In step S619, the control unit 201 determines whether the start button 310 shown in FIG. 3I is selected, and if it is determined that the start button is not selected, the control unit 201 returns the processing to step S618, and if it is determined that the start button is selected, the control unit 201 advances the processing to step S620.

In step S620, the control unit 201 controls the display unit 206 to display the initial screen of the application 301 shown in FIG. 3B. As a result, the user starts to use the functions of the application 301.

Character Complementing Processing

The following describes the character complementing processing performed in step S621 in FIGS. 6A-6B.

False recognition is a cause of a reduction in the accuracy of character recognition. For example, characters having similar features, such as the capital "I" and the numeric character "1", are likely to be falsely recognized.

If the control unit 201 fails to recognize characters and cannot acquire the model number in step S604, the control unit 201 performs the character complementing processing in step S621 in FIG. 6A by using a list that is held in the nonvolatile memory 203 in advance and includes characters that are likely to be falsely recognized in accordance with naming rules of the model number. For example, assume that, in a case where the model number is constituted by a character string "CAMERA-" and numeric characters according to the naming rules, the model number 501 shown in FIG. 5A, which is "CAMERA-123", has been falsely recognized as "CAMERA-123" through character recognition performed by the control unit 201. Since numeric characters follow "-" according to the naming rules, the control unit 201 determines that recognition of "I" is false, and complements the characters with the numeric character "1" that is most similar to "I", and thus acquires the character string "CAMERA-123". Thus, failures due to false recognition in acquiring the model number are prevented, and the rate of success in the model determination is increased.

According to the present embodiment, the user can establish a wireless LAN connection by merely performing operations for capturing the product label, the SSID, and the password of the camera 100 by using the smart device 200, and therefore operability at the time of connecting devices to each other can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-010541, filed Jan. 24, 2019 which is hereby incorporated by reference herein in its entirety.

What is claimed is:
1. A communication apparatus comprising:
a communication unit configured to communicate with an external apparatus;
a first reading unit configured to read predetermined information for specifying a type of the external apparatus from a captured image of the external apparatus;
a presenting unit configured to present an operation procedure for setting connection information, according to the type of the external apparatus specified using the predetermined information;
a second reading unit configured to read connection information from a captured image of the external apparatus, based on a display appearance of connection information according to the external apparatus; and
a control unit configured to connect with the external apparatus via the communication unit by using the connection information acquired by the second reading unit.

2. The apparatus according to claim 1, further comprising a display unit configured to display information acquired by the first reading unit and information acquired by the second reading unit.

3. The apparatus according to claim 1, wherein the second reading unit switches a method for reading the connection information according to the display appearance of the connection information according to the external apparatus.

4. The apparatus according to claim 1, further comprising an image capturing unit configured to capture the external apparatus,
wherein the image capturing unit displays a frame according to the display appearance of the connection information when capturing the external apparatus.

5. The apparatus according to claim 1, further comprising:
an image processing unit configured to perform image processing on image data obtained by capturing the external apparatus, so as to increase accuracy of reading by the first reading unit and the second reading unit; and
a character recognition unit configured to perform character recognition from image data that has undergone the image processing.

6. The apparatus according to claim 5, wherein the character recognition unit determines a font from character information acquired by the first reading unit and the second reading unit, and performs character recognition according to the font.

7. The apparatus according to claim 6, further comprising a complementing unit configured to perform character complementing processing with respect to a character that has been falsely recognized by the character recognition unit, based on naming rules of the predetermined information or naming rules of the connection information.

8. The apparatus according to claim 7, wherein the complementing unit performs the character complementing processing by referring to characters that are likely to be falsely recognized.

9. The apparatus according to claim 1, further comprising a search unit configured to search networks in the vicinity of the communication apparatus; and
a selection unit configured to select a network that matches or is similar to connection information acquired by the second reading unit, from the searched networks,
wherein the control unit connects with the selected network.

10. The apparatus according to claim 9, wherein the search unit searches networks after reading by the first reading unit and after reading by the second reading unit, and
the selection unit selects a network that matches or is similar to the connection information, from networks that have increased during a period between the search performed after reading by the first reading unit and the search performed after reading by the second reading unit.

11. A method of controlling a communication apparatus that communicates with an external apparatus, comprising:
- reading predetermined information for specifying a type of the external apparatus from a captured image of the external apparatus;
- presenting an operation procedure for setting connection information, according to the type of the external apparatus specified using the predetermined information;
- reading connection information from a captured image of the external apparatus, based on a display appearance of connection information according to the external apparatus; and
- connecting with the external apparatus by using the connection information.

12. A non-transitory computer-readable storage medium storing a program for causing a computer to execute a method of controlling a communication apparatus that communicates with an external apparatus, comprising:
- reading predetermined information for specifying a type of the external apparatus from a captured image of the external apparatus;
- presenting an operation procedure for setting connection information, according to the type of the external apparatus specified using the predetermined information;
- reading connection information from a captured image of the external apparatus, based on a display appearance of connection information according to the external apparatus; and
- connecting with the external apparatus by using the connection information.

* * * * *